(12) United States Patent
Chuang et al.

(10) Patent No.: US 12,723,607 B2
(45) Date of Patent: Sep. 1, 2026

(54) EXPANDABLE HOLDER RACK WITH ROTARY CLAMPING FUNCTION

(71) Applicant: EHOMA INDUSTRIAL CORPORATION, Taichung City (TW)

(72) Inventors: Chun-Huan Chuang, Taichung City (TW); Su-Wei Huang, Taichung City (TW)

(73) Assignee: EHOMA INDUSTRIAL CORPORATION, Taichung City (TW)

( * ) Notice: Subject to any disclaimer, the term of this patent is extended or adjusted under 35 U.S.C. 154(b) by 27 days.

(21) Appl. No.: 18/905,372

(22) Filed: Oct. 3, 2024

(65) Prior Publication Data

US 2026/0009411 A1 Jan. 8, 2026

(30) Foreign Application Priority Data

Jul. 4, 2024 (TW) ................................ 113207178

(51) Int. Cl.
*F16B 2/12* (2006.01)
*F16M 13/02* (2006.01)

(52) U.S. Cl.
CPC ............ *F16B 2/12* (2013.01); *F16M 13/022* (2013.01)

(58) Field of Classification Search
CPC ................................ F16B 2/12; F16M 13/022
USPC ....................................... 248/231.41, 231.51
See application file for complete search history.

(56) References Cited

U.S. PATENT DOCUMENTS 5,299,769 A * 4/1994 Reusche .............. F16M 13/022 248/219.2
7,537,190 B2 * 5/2009 Fan ...................... H04B 1/3877 379/426
7,614,595 B2 * 11/2009 Richter ............... B60R 11/0241 379/446
8,567,737 B2 * 10/2013 Chen .................... H04B 1/3877 379/454
9,133,982 B1 * 9/2015 Valdez ................. F16M 13/022
9,161,466 B2 * 10/2015 Huang ................. H05K 5/0208
9,416,814 B2 * 8/2016 Yeo ......................... F16B 47/00
9,581,291 B2 * 2/2017 Trotsky .................. F16M 13/04
9,797,543 B2 * 10/2017 Lin ........................ F16M 13/00
10,208,777 B1 * 2/2019 Brassard .............. F16M 11/041
(Continued)

FOREIGN PATENT DOCUMENTS

TW M645380 U 8/2023

*Primary Examiner* — Muhammad Ijaz
(74) *Attorney, Agent, or Firm* — MUNCY, GEISSLER, OLDS & LOWE, P.C.

(57) ABSTRACT

An expandable holder rack with rotary clamping function includes a main body, an actuating member, a resilient member, a clamping member, and a forcing member. The main body has an eccentric chamber containing the actuating member. The resilient element is connected with the main body and the actuating member. The clamping member is slidably disposed on the main body and connected with the actuating member, and allowed to expand outward and retract toward the main body when the resilient member causes the actuating member to reverse. The forcing member is disposed on the main body and rotates between a first and a second position. Thus, the forcing member presses the actuating member, preventing the clamping member from sliding, entering a positioned status; alternatively, the forcing member moves away from the actuating member, allowing the clamping member to slide, entering a free status.

9 Claims, 9 Drawing Sheets

(56) References Cited

U.S. PATENT DOCUMENTS 10,674,000 B1 * 6/2020 Chuang ................ F16M 11/105
11,363,895 B2 * 6/2022 Schuft ................... A47F 7/0246
2007/0262223 A1 * 11/2007 Wang .................. B60R 11/0241 248/346.07
2012/0312936 A1 * 12/2012 Huang ................. F16M 11/041 248/316.1
2013/0134284 A1 * 5/2013 Hu ....................... F16M 11/041 248/206.2
2015/0050077 A1 * 2/2015 Huang ............... F16M 11/2064 403/327
2015/0060624 A1 * 3/2015 Huang ................. F16M 11/105 248/316.4
2015/0230351 A1 * 8/2015 Yeo ......................... H04M 1/04 248/205.5
2015/0330426 A1 * 11/2015 Lien .......................... F16B 2/12 24/523
2016/0229352 A1 * 8/2016 Zhang .................. F16M 13/022
2017/0003148 A1 * 1/2017 Gianfranceschi ...... G01D 5/145
2018/0149302 A1 * 5/2018 Papapanos ........... F16M 13/022
2019/0249697 A1 * 8/2019 Liu ........................... F16B 2/12
2019/0309897 A1 * 10/2019 Ehlis Pirretas ..... B60R 11/0241
2020/0254940 A1 * 8/2020 Dang .................. B60R 11/0241
2021/0331759 A1 * 10/2021 Evans .................. F16M 11/105
2022/0117384 A1 * 4/2022 Whitten .................... A45F 5/10
2022/0186769 A1 * 6/2022 Spino ...................... A47J 47/16
2022/0205507 A1 * 6/2022 Huang .................... F16F 15/03
2024/0353054 A1 * 10/2024 Carnevali ............ F16M 11/041

* cited by examiner

FIG. 7

EXPANDABLE HOLDER RACK WITH ROTARY CLAMPING FUNCTION

BACKGROUND OF THE INVENTION

1. Field of the Invention

The present invention relates to holder racks, and more particularly, to an expandable holder rack with rotary clamping function.

2. Description of the Related Art

Referring to Taiwan Patent M645380, a mobile phone holder is disclosed, comprising a frame, multiple clamping members, a telescopic member, and elastic members. The clamping members are disposed around the frame. The telescopic member is slidably installed in the frame. Two of the clamping members are disposed at the end of the telescopic member to secure the mobile phone to the frame. The elastic member is disposed in the frame, with its two ends abutting against the clamping members and the frame. The user is allowed to adjust the distance between the upper and lower clamping members by pulling the clamping members upwards. When the clamping members are pulled up, the clamping members compress the elastic member. When the clamping members are released, the elastic member drives the clamping members to be recovered downward to accommodate phones of different sizes.

However, the aforementioned mobile phone holder lacks a locking structure, so that the mobile phone is kept on the frame only through the elasticity of the elastic member. Therefore, when traveling over rough terrain, vibrations from the ground might cause the phone to be easily detached from the frame, leading to possibility of drops and damage.

Although the mobile phone holder described above comprises multiple clamping members around the frame to secure the phone, excessive clamping members might cause inconvenience of the user placing or removing the phone from the frame.

SUMMARY OF THE INVENTION

To improve the issues above, the present invention discloses an expandable holder rack with rotary clamping function. When an object is placed on the expandable holder rack, the forcing member rotates to press the actuating member, so that the actuating member is unable to drive the clamping member to move, whereby the expandable holder rack stably clamps the object and prevents the object from detachment.

For achieving the aforementioned objectives, the present invention provides an expandable holder rack with rotary clamping function, comprising:

- a main body defining a first axis and a second axis in a non-coaxial arrangement and in parallel to each other, the main body having an eccentric chamber disposed along the second axis;
- an actuating member disposed in the eccentric chamber;
- a resilient member disposed in the eccentric chamber, with two ends of the resilient member connected with the main body and the actuating member, respectively;
- a clamping member slidably disposed on the main body and connected with the actuating member; when the clamping member is imposed with an external force to be expanded outward from the main body, the actuating member rotationally moves about the second axis, and the resilient member generates a recovering force; when the external force is removed, the resilient member drives the actuating member to reversely rotate through the recovering force, such that the clamping member retracts back toward the main body; and
- a forcing member disposed on the main body along the first axis, the forcing member being rotatable between a first position and a second position with respect to the main body; when at the first position, the forcing member presses the actuating member, so that the clamping member is unable to slide with respect to the main body and enters a positioned status; when at the second position, the forcing member moves away from the actuating member, so that the clamping member is able to slide with respect to the main body and enters a free status.

Also, in another embodiment, the present invention further provides an expandable holder rack with rotary clamping function, comprising:

- a main body defining a first axis and a second axis in a non-coaxial arrangement and in parallel to each other, the main body having an eccentric chamber disposed along the second axis;
- an actuating member disposed in the eccentric chamber;
- two clamping members slidably disposed on two sides of the main body, respectively, and connected with the actuating member; when the two clamping members open and close, the actuating member rotationally moves about the second axis; and
- a forcing member disposed on the main body along the first axis, the forcing member being rotatable between a first position and a second position with respect to the main body; when at the first position, the forcing member presses the actuating member, so that the two clamping members are unable to slide with respect to the main body and enters a positioned status; when at the second position, the forcing member moves away from the actuating member, so that the two clamping members are able to slide with respect to the main body and enters a free status.

With such configuration, the clamping member is pulled outward from the main body for clamping an object, and then the forcing member is rotated to press the actuating member, such that the actuating member fails to carry the clamping member to slide, entering a stable clamping status, thereby preventing the object from accidentally detached from the main body.

BRIEF DESCRIPTION OF THE DRAWINGS

FIG. 7 is a schematic view of the present invention clamping a mobile device, illustrating the clamping member being stretched to clamp the mobile device, with the forcing member at the second position.

DETAILED DESCRIPTION OF THE INVENTION

Figure 1:
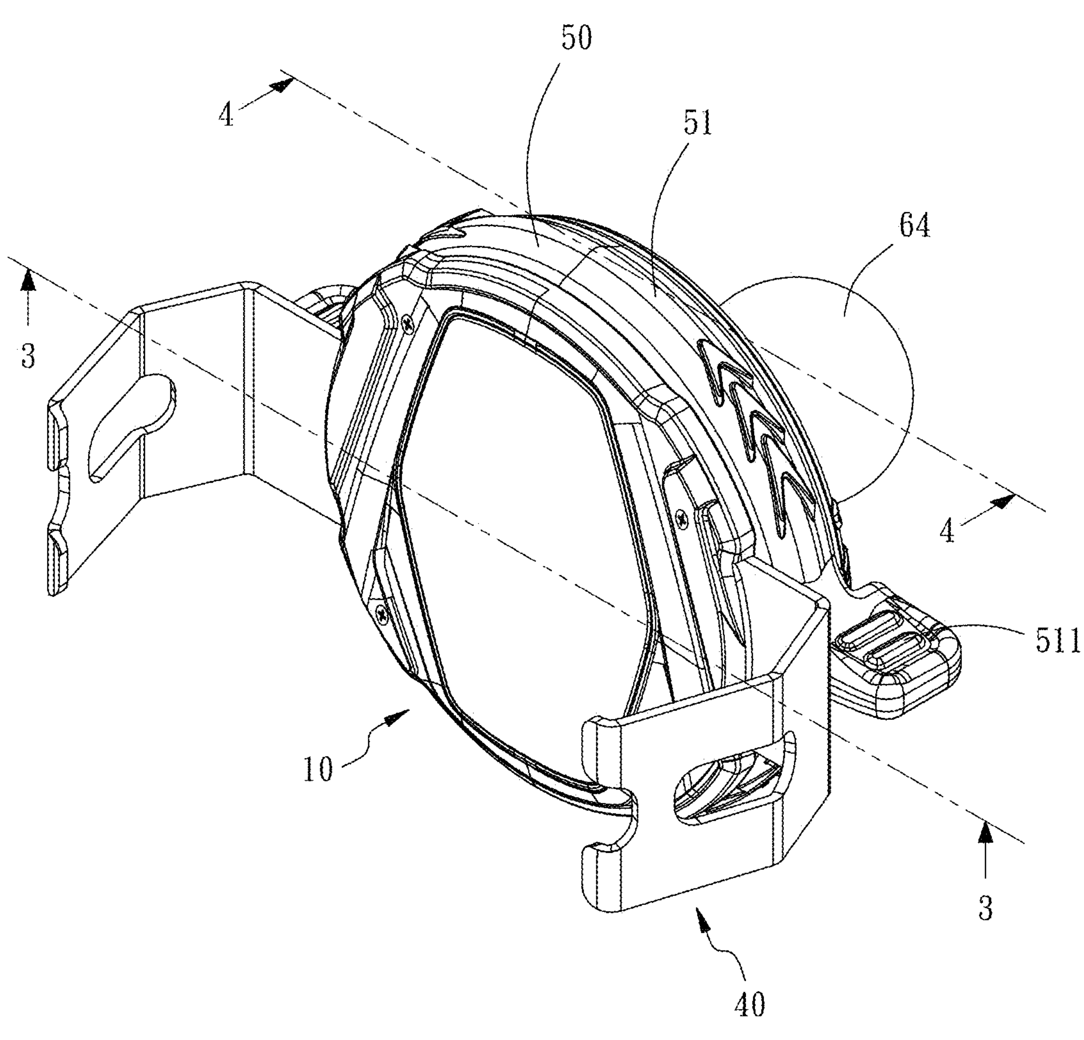
FIG. 1 is a perspective view of the expandable holder rack in accordance with an embodiment of the present invention.

The aforementioned and further advantages and features of the present invention will be understood by reference to the description of the preferred embodiment in conjunction with the accompanying drawings where the components are illustrated based on a proportion for explanation but not subject to the actual component proportion. Embodiments of the present invention are illustrated in detail along with the drawings. However, the technical features included by the present invention are not limited to certain embodiments hereby provided. Scope of the present invention shall be referred to the claims, which include all the possible replacements, modifications, and equivalent features. Also, for the purpose of improving readability, some portions of the components are omitted or represented by dashed lines in the drawings.

Referring to FIG. 1 to FIG. 8, the present invention provides an expandable holder rack with rotary clamping function 100, which is allowed to be installed on vehicles or traffic tools, such as a motorcycle, to securely hold and position a mobile device 1, such as a smartphone. The expandable holder rack with rotary clamping function 100 comprises a main body 10, an actuating member 20, a resilient member 30, a clamping member 40, and a forcing member 50.

Figure 3:
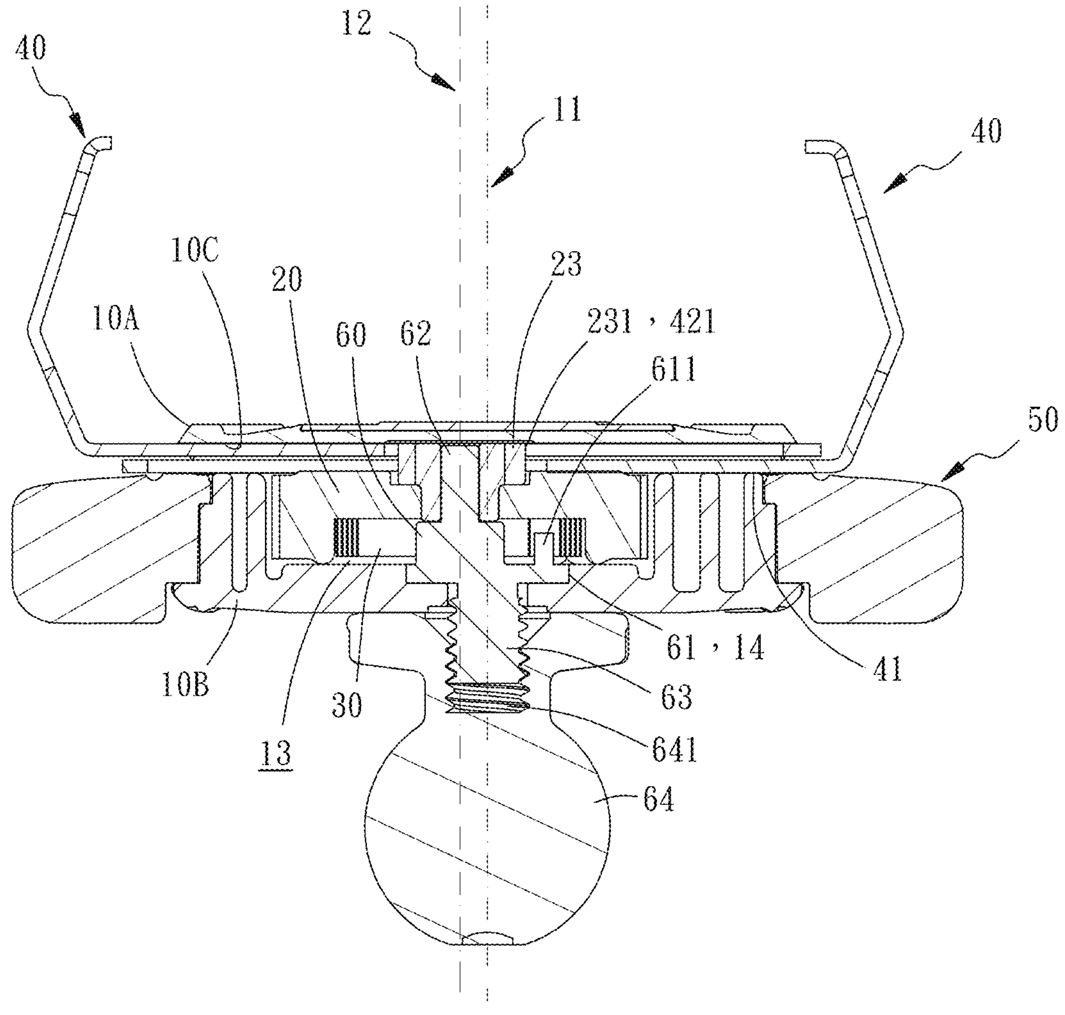
FIG. 3 is a cross-sectional view taken along line 3-3 in FIG. 1.
Figure 4:
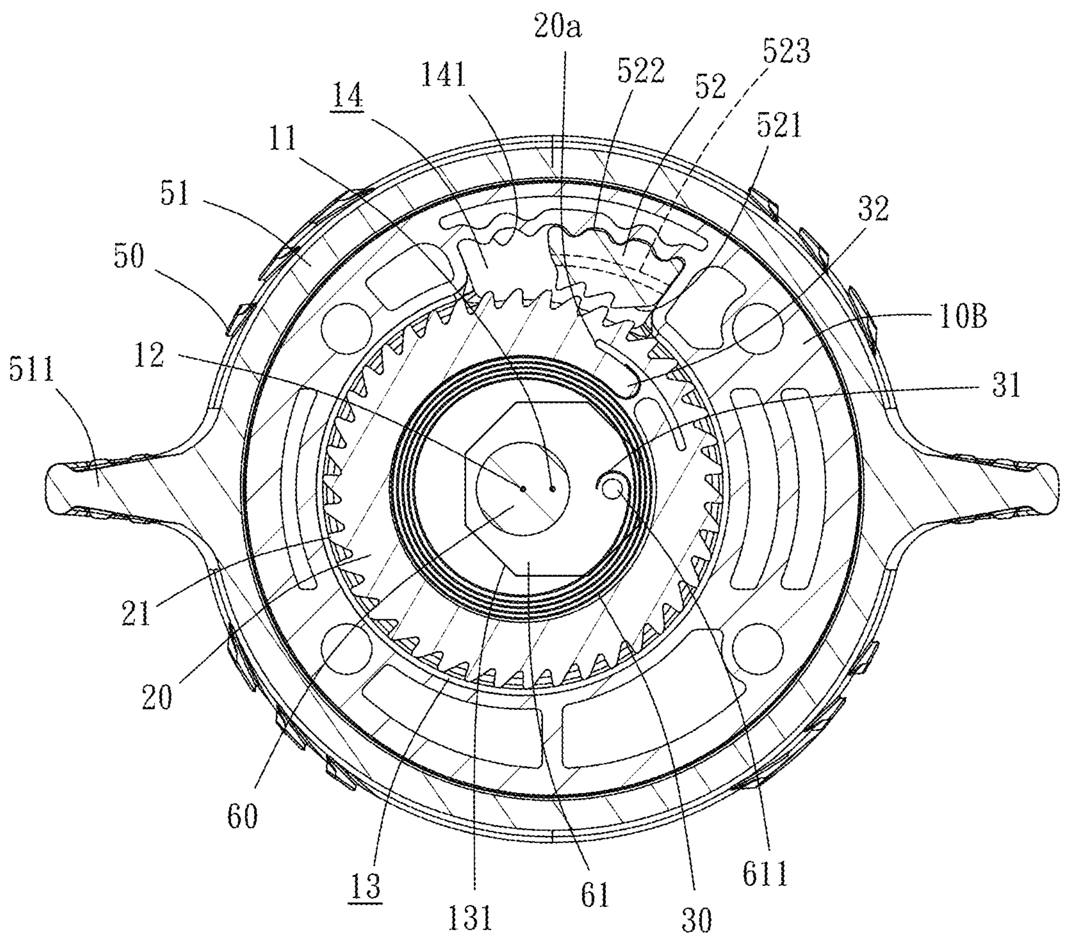
FIG. 4 is a cross-sectional view taken along line 4-4 in FIG. 1, illustrating the first positioning part coordinated with the second positioning part.
Figure 5:
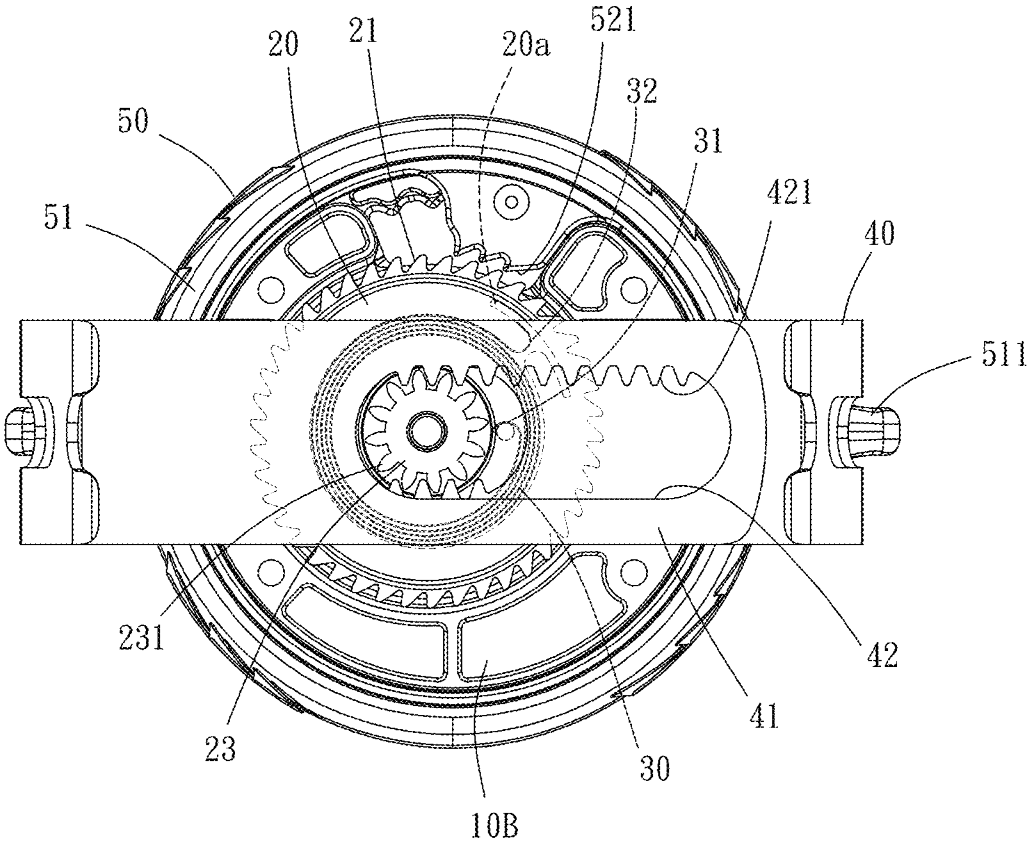
FIG. 5 is a schematic view of the present invention, illustrating the clamping member in the retracted status with respect to the main body.

The main body 10 defines a first axis 11 and a second axis 12. The first axis 11 is the central axis of the main body 10. The first axis 11 and the second axis 12 are disposed in a non-coaxial arrangement and in parallel to each other. The main body 10 comprises an eccentric chamber 13 formed in a circular shape and disposed along the second axis 12, with the second axis 12 passing through the center of the eccentric chamber 13. As shown by FIG. 4, one side of the eccentric chamber 13 is in communion with a position limiting groove 14 formed in an arc shape extension. The position limiting groove 14 comprises a first positioning part 141 formed in a continuous concave and convex shape. In an embodiment, the main body 10 comprises a front cover 10A and a seat B covered by the front cover 10A, wherein the front cover 10A covers the seat 10B through a screw 15. As shown by FIG. 3, two sliding grooves 10C are disposed on two sides between the front cover 10A and the seat 10B. The eccentric chamber 13 is disposed on the seat 10B, and the eccentric chamber 13 comprises a concave polygonal slot 131 arranged on the second axis 12.

The present invention further comprises a shaft member 60, which is disposed on the main body 10 in a non-rotatable arrangement. In the embodiment, the shaft member 60 comprises a polygonal plate 61. The polygonal plate 61 has a shaft pillar 62 protruding on one side thereof. The polygonal plate 61 is received in the polygonal slot 131 and prevented from relative rotation. The shaft pillar 62 is disposed in the eccentric chamber 13 and extends along the second axis 12. The polygonal 61 of the shaft pillar 62 has a protrusion pillar 611 on one side thereof. Also, the polygonal plate 61 has a bolt 63 disposed on one another side thereof. The bolt 63 passes through the polygonal slot 131 and is partially exposed from the seat 10B. The shaft member 60 has a ball joint 64 disposed on one side away from the shaft pillar 62. The ball joint 64 comprises a thread bore 641 screwedly combined with the bolt 63, so that the ball joint 64 is positioned on the back of the seat 10B, such that the expandable holder rack 100 is installed on a fixing mechanism (not shown) on a traffic tool and allowed for muti-angular rotation.

The actuating member 20 is rotatably disposed in the eccentric chamber 13. The actuating member 20 comprises a ratchet tooth 21 surrounding the actuating member 20, and a square bore 22 passing through the center of the actuating member 20. In the embodiment, a gear member 23 is rotatably mounted around the shaft pillar 62, wherein the gear member 23 and the actuating member 20 are disposed in an coaxial arrangement. The gear member 23 comprises a transmission tooth 231, a shaft bore 232, and a square pillar 233. The square pillar 233 is received in the square bore 22 of the actuating member 20 and prevented from relative rotation. The shaft bore 232 of the gear member 23 is mounted around the shaft pillar 62, such that the actuating member 20 and the gear member 23 are allowed to simultaneously rotate with respect to the shaft member 60.

In addition, referring to FIG. 4, the actuating member 20 comprises a hooking groove **20*a* on one lateral side facing the eccentric chamber 13**.

The resilient member 30 is disposed in the eccentric chamber 13, with two ends of the resilient member 30 connected with the main body 10 and the actuating member 20, respectively. In the embodiment, the resilient member 30 is a scroll spring. The resilient member 30 comprises a first hooking end 31 fixed to the protrusion pillar 611 of the shaft member 60, and a second end 32 fixed to the hooking groove **20*a*, so that the resilient member 30 is connected between the shaft member 60 and the actuating member 20. When the actuating member 20 rotates clockwise or counterclockwise, the resilient member 30** exhibits a coiling or expansion phenomenon, generating a recovering force.

The clamping member 40 is provided in an amount of two in the embodiment. The two clamping member 40 are disposed on two sides of the main body 10, respectively, so as to generate an opening or closing motion with respect to the main body 10. In another embodiment, only one clamping member 40 is provided. For example, the main body 10 comprises a fixed member and a clamping member 40 slidably disposed on the main body 10, so that the clamping member 40 is able to generate an opening and closing motion with the fixed member.

In the embodiment, each clamping member 40 comprises a sliding part 41 passing through the sliding groove 10C of the main body 10, so that the two clamping members 40 are stacked in the sliding groove 10C to be slidably disposed on two sides of the main body 10, respectively. Each clamping member 40 is connected with the actuating member 20. Each sliding part 41 has an elongated bore 42 formed in an enclosed shape, with a tooth rack 421 disposed on one side of the inner edge of the elongated bore 42. The transmission tooth 231 of the gear member 23 is positioned in the two elongated bores 42 to be engaged with the two tooth racks 421, such that the clamping members 40 are transmissionally connected with the actuating member 20 through the gear member 23.

Figure 2:
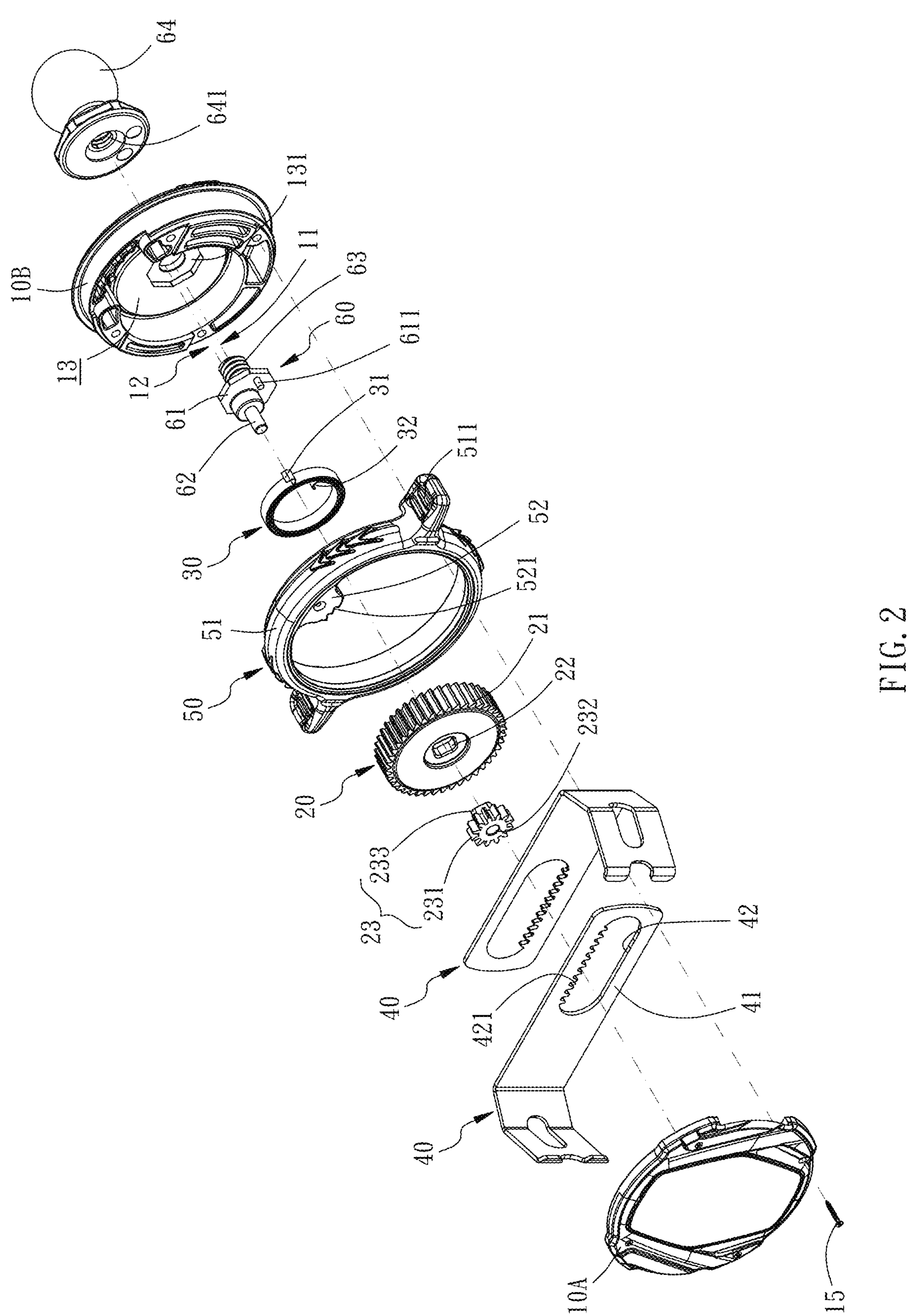
FIG. 2 is an exploded view of the expandable holder rack in accordance with an embodiment of the present invention.
Figure 6:
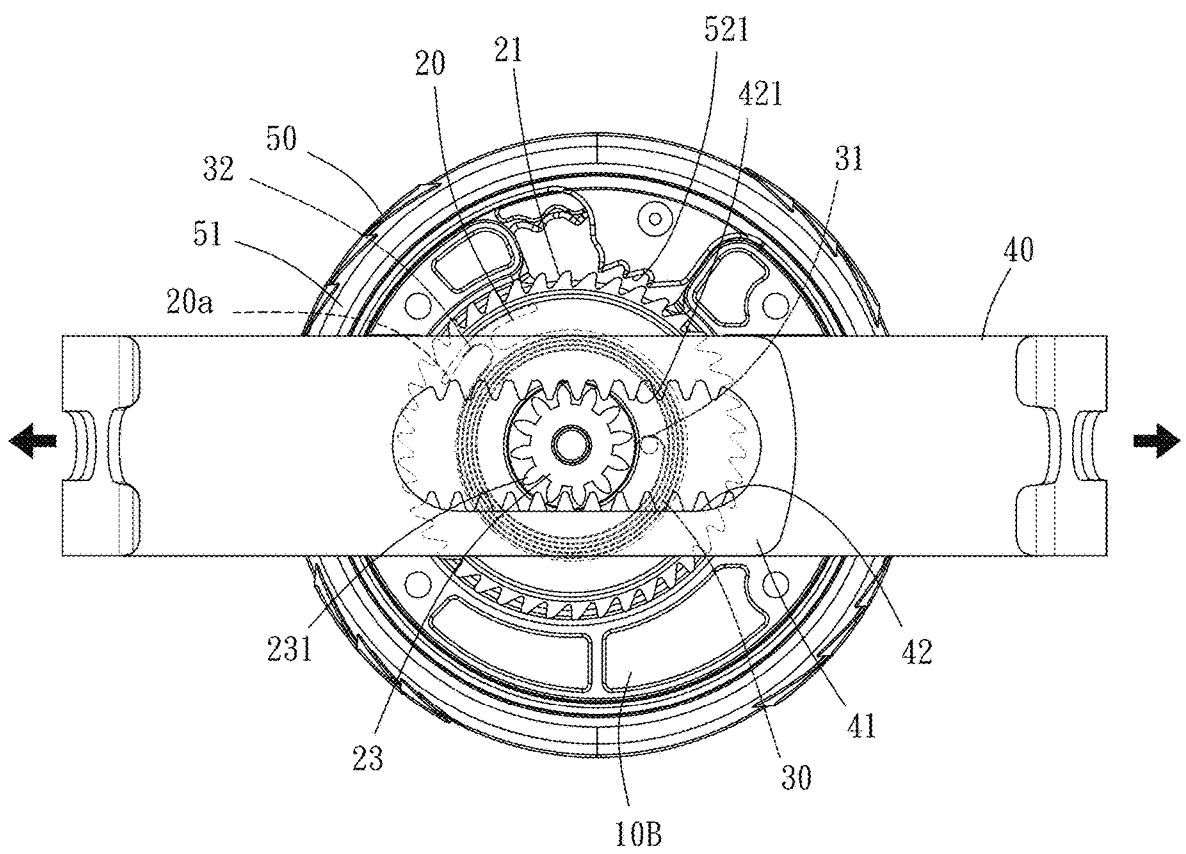
FIG. 6 is a schematic view of the present invention, illustrating the clamping member in the stretched status with respect to the main body.
Figure 7:
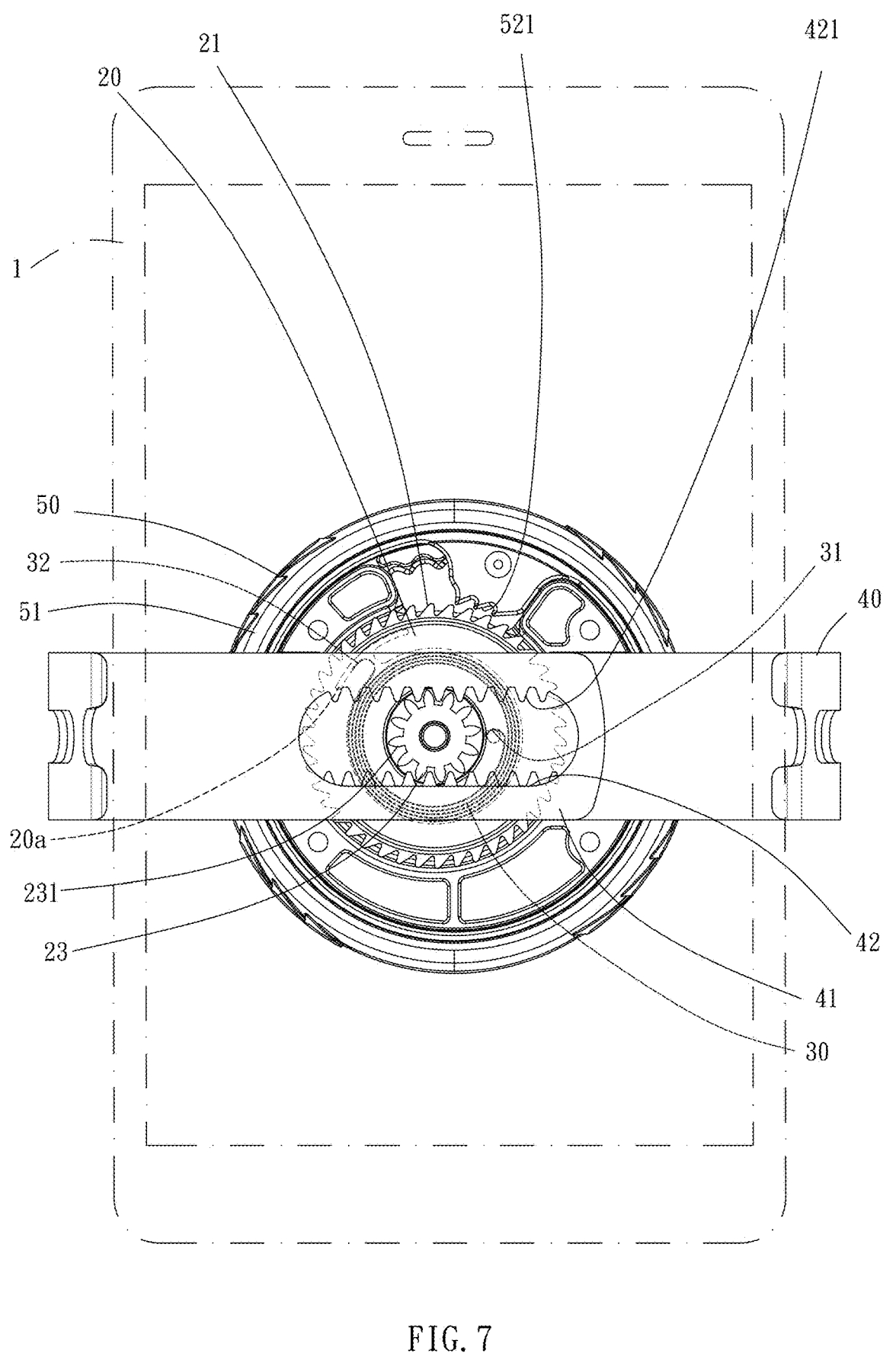

Accordingly, referring to FIG. 6 in view of FIG. 2, when the two clamping members 40 are imposed with an external force to expand outward from the main body 10, the tooth rack 421 drives the gear member 23 to rotate, so as to simultaneously drive the actuating member 20 to move, so that the actuating member 20 generates a rotational movement about the second axis 12, and the resilient member 30 generates a recovering force. When the external force is removed (the two clamping member 40 stops expanding), the recovering force of the resilient member 30 forces the actuating member 20 to reversely rotate, so that the two sliding part 41 enter the main body 10, and the two clamping member 40 generates a retraction, thereby clamping the mobile device 1, as shown by FIG. 7.

The forcing member 50 is disposed on the main body 10 along the first axis 11, and rotatable between a first position and a second position with respect to the main body 10. In the embodiment, the forcing member 50 comprises a ring part 51 mounted around the periphery of the seat 10B of the main body 10. The forcing member 50 is arranged on the back side of the two clamping members 40. Each of two sides of the ring part 51 comprises an operation protrusion 511, respectively, by which the user drives them to operate.

The forcing member 50 comprises a pawl 52 disposed on the inner side of the ring part 51 and extending toward the first axis 11. The pawl 52 is received in the position limiting groove 14 of the main body 10. When the forcing member 50 rotates with respect to the main body 10, the pawl 52 moves between two ends of the position limiting groove 14. Further, referring to FIG. 2 and FIG. 4, the pawl 52 comprises a tooth face 521 facing the actuating member 20 and engaged with the rachet tooth 21, and a second positioning part 522 in opposite to the tooth face 521. The second positioning part 522 is formed in a continuous concave and convex shape, so as to be matched with the first positioning part 141. Also, the first positioning part 141 and the second positioning part 522 generates a frictional positioning effect, whereby the forcing member 50 is kept at the first position or the second position. Also, a sectional groove 523 is formed between the second positioning part 522 and the tooth face 521, providing a resiliency to the second positioning part 522, enabling the second positioning part 522 to abut against the first positioning part 141.

Figure 8:
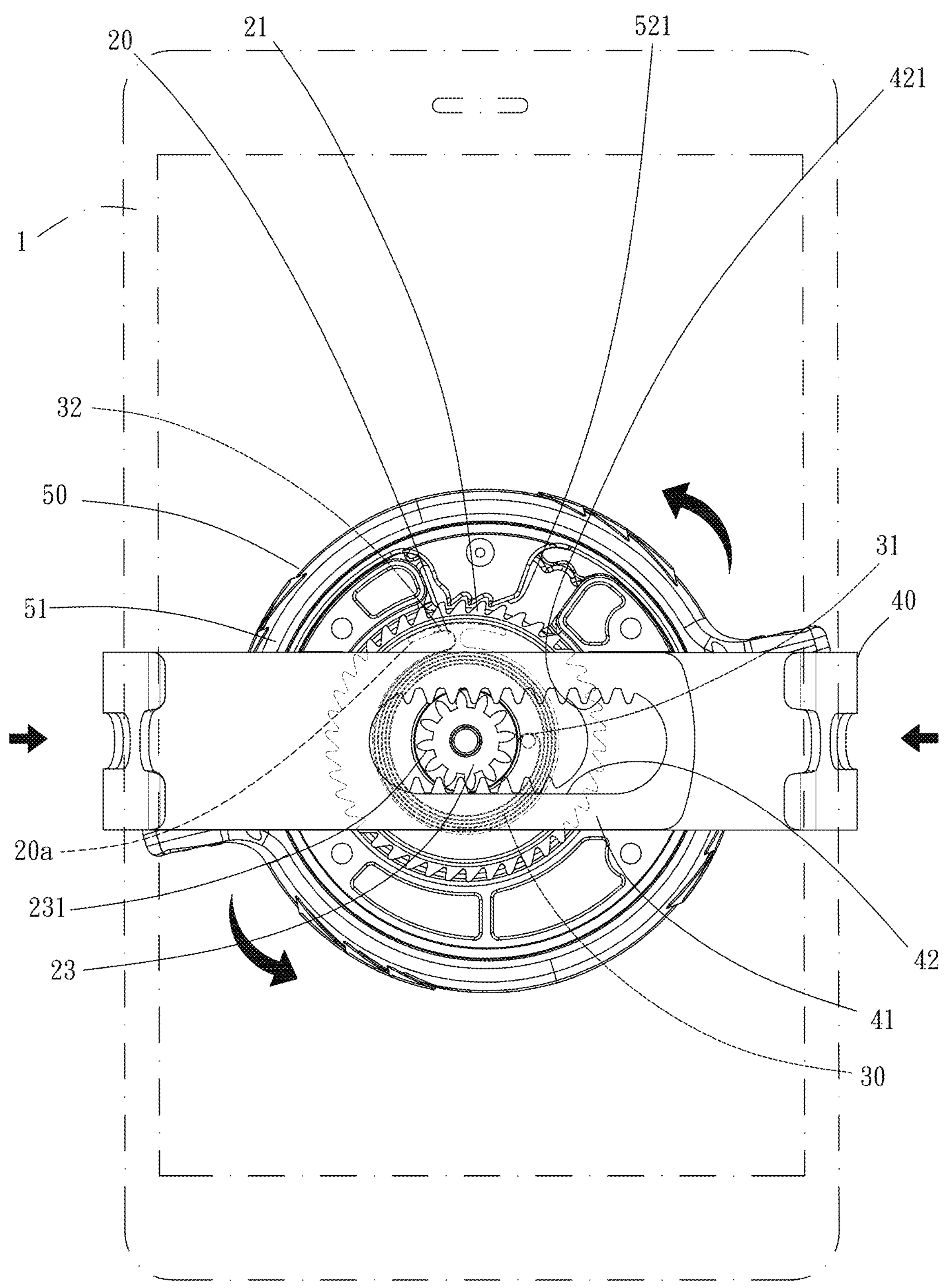
FIG. 8 is a schematic view of the forcing member at the first position, illustrating the forcing member pressing the actuating member.

At the first position, the pawl 52 is engaged with the rachet tooth 21, and the forcing member 50 presses the actuating member 20, so that the actuating member 20 is unable to rotate, whereby the two clamping members 40 are not allowed to slide with respect to the main body 10, achieving the positioned status, as shown by FIG. 8. At the second position, the forcing member 50 moves away from the actuating member 20; in other words, the pawl 52 is not engaged with the rachet tooth 21 and leaves the ratchet tooth 21, so that the actuating member 20 is allowed to rotate, whereby the two clamps 40 are able to slide with respect to the main body 10, achieving the free status, as shown by FIG. 7.

With such configuration, during the actual operation of the present invention, when the ball joint 64 is installed on the traffic tool, the forcing member 50 is at the second position. The user uses one hand to pull one of the clamping members 40 to make it slide outward from the main body 10, and the other clamping member 40 is also driven to slide, such that the user is allowed to use only one hand to place the mobile device 1 between the two clamping members 40; then, the user releases the clamping members 40, and the resilient member 30 drives the actuating member 20 to reverse, by which the gear member 23 also reversely rotates and drives the sliding part 41 of the two clamping members 40 to simultaneously retract into the main body 10 until the two clamping members 40 abut against two sides of the mobile device 1, entering a temporary positioned status.

Next, the user rotates the forcing member 50 to the first position, and the pawl 52 of the forcing member 50 is engaged with the ratchet tooth 21 of the actuating member 20, so as to inhibit the actuating member 20 from rotating, whereby the two clamping members 40 are unable to be pulled outward from the main body 10, preventing the mobile device 1 from detaching from the main body 10 and achieving a stable clamping effect.

Further, when the pawl 52 is engaged with the ratchet tooth 21, the user is allowed to rotate the forcing member 50 once again, so as to increase the rotation angle of the pawl 52 of the forcing member 50 with respect to the actuating member 20, whereby the pawl 52 is engaged with more teeth of the ratchet tooth 21, improving the self-locking effect and preventing unnecessary loosening or detachment caused by external force.

Figure 9:
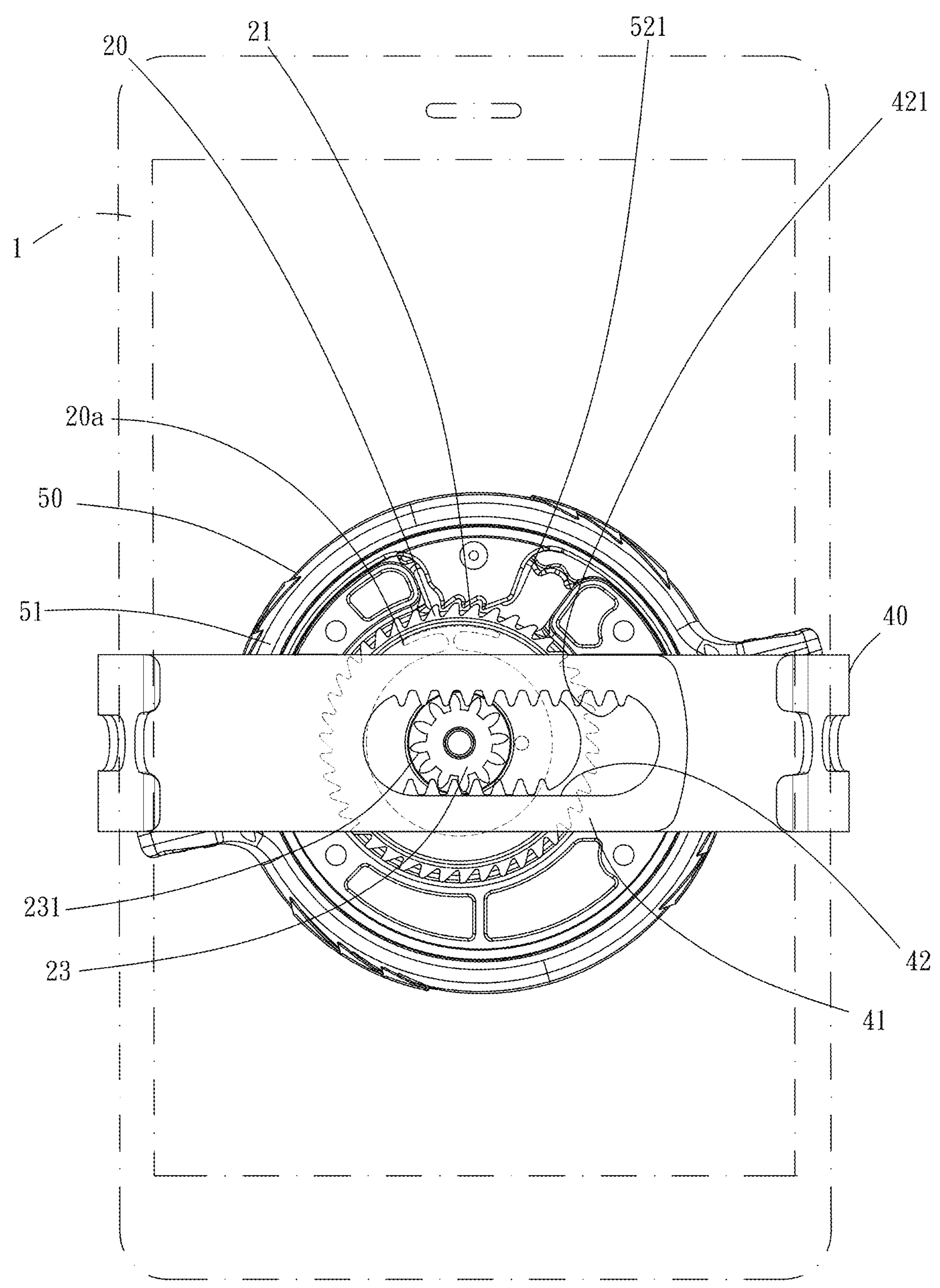
FIG. 9 is a schematic view of another embodiment of the present invention clamping a mobile device.

Referring to FIG. 9, the second embodiment of the present invention is provided. The difference with the first embodiment lies in that the second embodiment does not apply the aforementioned resilient member 30. Differently, instead of using the recovering force provided by the resilient member 30, the two clamping members 40 directly retract back with respect to the main body 10. With the rotational operation of the forcing member 50 between the first position and the second position, at the first position, the forcing member 50 presses the actuating member 20, so that the two clamping member 40 are unable to slide with respect to the main body 10, achieving the positioned status; at the second position, the forcing member 50 leaves the actuating member 20, so that the two clamping members 40 are able to slide with respect to the main body 10, achieving the free status. Therefore, the second embodiment still realizes the purpose and function of stably clamping the mobile device 1.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An expandable holder rack with rotary clamping function, comprising:

a main body defining a first axis and a second axis in a non-coaxial arrangement and in parallel to each other, the main body having an eccentric chamber disposed along the second axis;

an actuating member rotatably disposed in the eccentric chamber and comprising a ratchet tooth surrounding the actuating member;

a resilient member disposed in the eccentric chamber, with two ends of the resilient member connected with the main body and the actuating member, respectively;

a clamping member slidably disposed on the main body and connected with the actuating member; when the clamping member is imposed with an external force to be expanded outward from the main body, the actuating member rotationally moves about the second axis, and the resilient member generates a recovering force; when the external force is removed, the resilient member drives the actuating member to reversely rotate through the recovering force, such that the clamping member retracts back toward the main body; and a forcing member disposed on the main body along the first axis, the forcing member being rotatable between a first position and a second position with respect to the main body and comprising a pawl;

wherein one side of the eccentric chamber is in communication with a position limiting groove formed in an arc shape extension, the pawl being received in the position limiting groove and movable between two ends of the position limiting groove;

the position limiting groove comprising a first positioning part;

the pawl comprising a tooth face facing the actuating member and engaged with the ratchet tooth, and a second positioning part opposite to the tooth face;

wherein the second positioning part and the first positioning part generate a frictional positioning effect, whereby the pawl is kept at the first position or the second position;

the first positioning part and the second positioning part being formed in a continuous concave and convex shape matching each other;

wherein at the first position, the pawl is engaged with the ratchet tooth so that the actuating member is unable to rotate, and the clamping member is unable to slide with respect to the main body and enters a positioned status; and wherein at the second position, the pawl leaves the ratchet tooth so that the actuating member is able to rotate, and the clamping member is able to slide with respect to the main body and enters a free status.

2. The expandable holder rack of claim 1, wherein a sectional groove is formed between the second positioning part and the tooth face.

3. The expandable holder rack of claim 1, wherein the forcing member comprises a ring part mounted around a periphery of the main body; the pawl is disposed on an inner side of the ring part and extends toward the first axis.

4. The expandable holder rack of claim 3, wherein each of two sides of the ring part comprises an operation protrusion, respectively.

5. The expandable holder rack of claim 4, wherein two clamping members are included; each of the clamping members comprises a sliding part passing through the main body, and each sliding part comprises a tooth rack; a shaft member is further included and disposed on the main body in a non-rotatable arrangement; the shaft member comprises a shaft pillar protruding in the eccentric chamber and extending along the second axis; the resilient member is connected with the shaft member and the actuating member; the a gear member is mounted around the shaft pillar; the gear member and the actuating member are disposed in an coaxial arrangement; the gear member comprises a transmission tooth to be engaged with the tooth rack.

6. The expandable holder rack of claim 5, wherein the actuating member comprises a square bore; the gear member comprises a shaft bore and a square pillar; the square pillar is received in the square bore; the shaft bore is mounted around the shaft pillar.

7. The expandable holder rack of claim 5, wherein the main body comprises a front cover and a seat covered by the front cover; two sliding grooves are disposed on two sides between the front cover and the seat; the eccentric chamber is disposed on the seat; the forcing member is rotatably disposed on a periphery of the seat; the shaft member comprises a ball joint disposed away from the shaft pillar and arranged on a back of the seat.

8. The expandable holder rack of claim 7, wherein the shaft member comprises a polygonal plate; the shaft pillar protruding on the polygonal plate; the eccentric chamber comprises a concave polygonal slot, in which the polygonal plate is received; the shaft pillar comprises a protrusion pillar disposed on one side thereof; the actuating member comprises a hooking groove on one lateral side thereof; the resilient member is a scroll spring; the resilient member comprises a first hooking end fixed to the protrusion pillar, and a second end fixed to the hooking groove; each of the two sliding parts has an elongated bore formed in an enclosed shape, with a tooth rack disposed on one side of an inner edge of the elongated bores; the transmission tooth is positioned in the elongated bores of the two sliding parts to engage the respective tooth racks.

9. An expandable holder rack with rotary clamping function, comprising:

a main body defining a first axis and a second axis in a non-coaxial arrangement and in parallel to each other, the main body having an eccentric chamber disposed along the second axis;

an actuating member rotatably disposed in the eccentric chamber and comprising a ratchet tooth surrounding the actuating member;

two clamping members slidably disposed on two sides of the main body and connected with the actuating member, respectively; when the two clamping members open and close, the actuating member rotationally moves about the second axis; and a forcing member disposed on the main body along the first axis, the forcing member being rotatable between a first position and a second position with respect to the main body and comprising a pawl;

wherein one side of the eccentric chamber is in communication with a position limiting groove formed in an arc shape extension, the pawl being received in the position limiting groove and movable between two ends of the position limiting groove;

the position limiting groove comprising a first positioning part;

the pawl comprising a tooth face facing the actuating member and engaged with the ratchet tooth, and a second positioning part opposite to the tooth face;

wherein the second positioning part and the first positioning part generate a frictional positioning effect, whereby the pawl is kept at the first position or the second position;

the first positioning part and the second positioning part being formed in a continuous concave and convex shape matching each other;

wherein at the first position, the pawl is engaged with the ratchet tooth so that the actuating member is unable to rotate and the two clamping members are unable to slide with respect to the main body and enter a positioned status;

wherein at the second position, the pawl leaves the ratchet tooth so that the actuating member is able to rotate and the two clamping members are able to slide with respect to the main body and enter a free status.

* * * * *